United States Patent Office

3,228,910
Patented Jan. 11, 1966

3,228,910
PROCESS FOR PREPARING SOLID POLY-1,4-
PHENYLENE ETHERS
Gelu Stoeff Stamatoff, Newark, Del., assignor to E. I. du Pont de Nemours and Company, Wilmington, Del., a corporation of Delaware
No Drawing. Filed Sept. 22, 1960, Ser. No. 57,629
12 Claims. (Cl. 260—47)

This invention relates to solid poly-1,4-phenylene ethers and to a novel process for preparing the same.

Heretofore polyphenylene ethers which have been mixtures of the 1,4- and 1,3-isomers have been prepared in liquid form. Efforts to produce high molecular weight polymeric solid poly-1,4-phenylene ethers were not successful prior to the present invention.

In accordance with this invention a novel resin, namely solid poly-1,4-phenylene ether, has been obtained. This novel polymeric material can be molded to produce transparent shaped objects, and can be obtained in the form of a stiff, tough film. It can also be drawn from the melt in the form of a fiber. One of its outstanding characteristics from the standpoint of utility is its resistance to heat. Films and other shaped objects made from this novel polymeric material can be heated for prolonged periods of time at temperatures as high as 300° C. without apparent change.

While various processes have been used in accordance with this invention to prepare the above-described polymeric material, the process which is most satisfactory is to heat sodium p-bromophenolate with a cuprous salt complex at a temperature of 140° to 250° C. in the presence of an inert organic liquid medium in which the sodium p-bromophenolate is solublue. In preferred embodiments the temperature is maintained within the range of 170° to 200° C. The polymerization takes place fairly rapidly, and is usually complete in a few hours when a catalytic quantity of the cuprous salt complex is employed. The reaction time is generally within the range of about 1–20 hours. The catalyst concentration can be varied rather widely, and may be as low as about 0.02 gram of complex per 100 grams of the inert organic liquid medium. As the reaction approaches completion, the polymeric product tends to separate as a separate solid phase. This solid precipitate can be removed by filtration and washed with an organic solvent, such as methanol or acetone, to remove the low molecular weight organic impurities, followed by a water wash to remove any inorganic impurities which are water soluble. The resulting product can be dried suitably in a dry oven at elevated temperatures, e.g. about 100° C. In general, the yields obtained are substantially quantitative.

In carrying out the polymerization reaction the cuprous salt is kept at a lower state of valence by maintaining the reaction mixture in an oxygen-free atmosphere. This can be accomplished conveniently by employing a nitrogen, helium, or other inert gaseous blanket over the reaction mixture. In particular embodiments, the washing of the polymeric product can be effected in a Waring Blendor or other similar device for promoting contact between the organic solvent and the impurities contained in the polymer. Several washings are usually desirable for a satisfactory clean-up of the polymer. Alternatively, the removal of impurities by the solvent can be accomplished under refluxing conditions.

The cuprous complex which is employed as a catalyst in the process of the invention usually contains a cuprous halide, namely cuprous chloride, cuprous bromide, or cuprous iodide, each of which is highly effective, but other cuprous salts may be employed somewhat less satisfactorily. Examples of the latter are cuprous abietate (formed in situ by reduction of cupric abietate), cuprous formate, etc. The cuprous salt in the complex is combined with a complexing agent, such as pyridine, dimethyl acetamide, quinoline, dimethyl formamide, N-methyl pyrrolidone, or the like. The quantity of the complex agent can be varied rather widely but is usually in excess of the quantity of the cuprous salt.

The inert organic liquid medium should be one in which sodium p-bromophenolate is soluble. Examples of such media are benzophenone, dialoxy benzenes in which each alkoxy group contains from 1 to 4 carbon atoms, diphenyl sulfone, trialkoxy benzenes wherein each alkoxy group contains from 1 to 4 carbon atoms, benzonitrile, or the like.

Any appropriate method may be employed for the preparation of the sodium p-bromophenolate. A suitable method is the following.

PREPARATION OF SODIUM p-BROMOPHENOLATE

Into a 1 liter flask was placed 500 cc. methanol. This was sparged with $N_2$ to remove the air from the flask. Sodium (17.38 grams, .756 mole) was then added, and the mixture was stirred and cooled by an ice bath. After the sodium had dissolved, p-bromophenol (130.80 grams, .756 mole) was added. The mixture was heated by means of a boiling water bath while passing $N_2$ through the methanol, until solid Na-salt of p-bromophenol remained in the flask. This was further dried by heating at 100° C. under diminished pressure.

The salt thus obtained was colorless. It was used for the preparation of poly-1,4-phenylene ether as described below.

Other procedures for making sodium p-phenolate include heating p-bromophenol with NaOH solution in methanol.

The method for preparing the catalyst is simply to mix the copper salt with the complexing agent in an oxygen-free atmosphere. For example, the following procedure gives rise to a highly satisfactory catalyst for use in the polymerization process.

PREPARATION OF THE CATALYST

Into a bottle in an atmosphere of $N_2$ was placed 0.2 gram of $Cu_2Cl_2$ and several clean pieces of copper were added. To this was added 20 cc. pyridine. The mixture was agitated, forming a light brownish solution. The catalyst solution was very sensitive to oxygen. The solution was evaporated to dryness, leaving a complex of $Cu_2Cl_2$ with pyridine.

Complexes of $Cu_2Cl_2$ with quinoline, dimethyl formamide, dimethyl acetamide, N-methyl pyrrolidone were prepared by the same procedure, by substituting the compounds for pyridine.

The polymerization procedure can be performed in any suitable equipment, such as a glass-lined reaction vessel which has been flushed free of air by means of dry nitrogen. The mixture should be kept free of oxygen through the filtration step and the recovered filtrate can be used for recovery of inert solvent by any suitable method, such as distillation. In nearly all instances the final product is so viscous that dilution with methanol or other similar solvent is necessary prior to filtration. The addition of methanol increases the amount of precipitate which is formed, and in some instances actually causes the formation of precipitate when none has previously separated.

The invention is illustrated further by means of the following examples.

*Example 1*

Into a glass tube having a diameter of 1 inch and 13 inches in length, a stream of dry helium was directed. Into the oxygen-free tube was injected 10 grams of p-diethoxybenzene and 10 grams of sodium p-bromophenolate. The contents of the tube were freed of any further quantity of oxygen by evacuating the tube three times and replacing the atmosphere with helium. The tube was then heated to a temperature of 168° C. and a catalyst consisting of .01 gram cuprous chloride in 1 cc. pyridine was injected. Heating was continued for 20 hours. The contents of the tube were cooled and removed from the tube by means of acetone in large excess. The resulting mixture was treated with further quantities of acetone and methanol in a Waring Blendor and washed several times with boiling dilute hydrochloric acid. The resulting polymer was washed again with methanol and water and finally with a methanol-acetone mixture. The resulting polymer when dried in a drying oven was obtained in the form of a white powder which can be melted at a temperature of about 350° C. and melt-drawn into a fiber.

*Example II*

The procedure of Example I was repeated, using the materials listed in the following table. The results were as reported in the table. In each run, 10 grams of sodium p-bromophenolate was used as the monomer.

TABLE I.—PREPARATION OF SOLID POLY-1,4-PHENYLENE ETHER

| Run No. | Solvent | Catalyst | Atmosphere | Temperature, °C. | Time | Wt. Solid Polymer Obtained |
|---|---|---|---|---|---|---|
| 1 | 10 grams p-dimethoxy benzene | 0.01 gram $Cu_2Cl_2$, 1 cc. pyridine | $N_2$ | 200 | 2.5 | 4.4 |
| 2 | 10 grams m-dimethoxy benzene | ----do---- | $N_2$ | 200 | 20 | [1] 4.8 |
| 3 | 20 cc. m-diethoxy benzene | ----do---- | $N_2$ | 200 | 22 | 4.1 |
| 4 | 20 grams 1,3,5-trimethoxy benzene | ----do---- | $N_2$ | 200 | 48 | 4.0 |
| 5 | 20 grams $(C_6H_5)_2SO_2$ | ----do---- | $N_2$ | 200 | 16 | 4.2 |
| 6 | 20 grams $C_6H_5NO_2$ | ----do---- | $N_2$ | 200 | 23 | 3.8 |
| 7 | 10 cc. m-dimethoxy benzene | 0.01 gram $CuCl_2$, 1 cc. benzothizaole | $N_2$ | 200 | 21.5 | 4.5 |
| 8 | 10 grams p-dimethoxy benzene | 0.01 gram $CuCl_2$, 1 cc. dimethyl-acetamide | He | 200 | 4.5 | 4.5 |
| 9 | ----do---- | 0.01 gram $Cu_2Cl_2$, 1 cc. dimethylformamide | He | 200 | 1.5 | 4.1 |
| 10 | 10 cc. dimethylacetamide | 0.01 gram $Cu_2Cl_2$, 1 cc. dimethyl acetamide | He | 162 | 24.5 | 2.5 |
| 11 | 10 grams $(p-CH_3OC_6H_4)_2O$ | 0.01 gram $Cu_2Cl_2$, 1 cc. pyridine | He | 200 | 24 | [2] 4.2 |
| 12 | 10 grams $(C_6H_5)_2CO$ | 0.01 gram $Cu_2Cl_2$, 1 cc. pyridine | He | 200 | 5.3 | [2] 4.1 |
| 13 | 10 grams m-dimethoxy benzene | 0.01 gram cupric abietate, 0.01 gram mixed imidazolines-"alrose C". | $N_2$ | 200 | 21.5 | 4.5 |

[1] Analysis: C, 75.92; H, 4.33.
[2] Tough clear.

The polymer obtained as described in the foregoing examples can be molded at 300° to 325° C. to give shaped objects, such as sheeting.

I claim:

1. A process for producing solid poly-1,4-phenylene ether which comprises heating, in an inert oxygen-free atmosphere, sodium p-bromophenolate with a complex of a cuprous salt and a monomeric organic compound containing tertiary nitrogen atoms at 140° to 250° C. in the presence of an inert organic liquid medium in which the sodium p-bromophenolate is soluble, and separating solid poly-1,4-phenylene ether from the resulting mixture.

2. Process of claim 1 wherein the temperature is from 170° to 200° C.

3. A process for producing solid poly-1,4-phenylene ether which comprises heating, in an inert oxygen-free atmosphere, sodium p-bromophenolate with catalytic quantity of cuprous chloride-pyridine complex, in an inert organic liquid medium in which the sodium p-bromophenolate is soluble, whereby poly-1,4-phenylene ether is formed, and separating solid poly-1,4-phenylene ether from the resultant mixture.

4. Process of claim 3 wherein said medium is benzophenone.

5. Process of claim 3 wherein said medium is a dialkoxybenzene wherein each alkoxy group contains from 1 to 4 carbon atoms.

6. Process of claim 3 wherein said medium is diphenyl sulfone.

7. Process of claim 3 wherein said medium is a trialkoxybenzene wherein each alkoxy group contains from 1 to 4 carbon atoms.

8. Process of claim 3 wherein said medium is nitrobenzene.

9. Process of claim 1 wherein the complex of a cuprous salt with an organic compound containing tertiary nitrogen is a cuprous chloride complex in which cuprous chloride is combined with dimethyl acetamide.

10. Process of claim 1 wherein the complex of a cuprous salt with an organic compound containing tertiary nitrogen is a cuprous chloride complex in which cuprous chloride is combined with benzothiazole.

11. Process of claim 1 wherein the complex of a cuprous salt with an organic compound containing tertiary nitrogen is a cuprous chloride complex in which cuprous chloride is combined with dimethyl formamide.

12. Process of claim 1 wherein the complex of a cuprous salt with an organic compound containing tertiary nitrogen is a cuprous chloride complex in which cuprous chloride is combined with an imidazoline.

References Cited by the Examiner

UNITED STATES PATENTS

| 2,911,380 | 11/1959 | Doedens | 260—47 |
| 2,961,384 | 11/1960 | McKinney et al. | 260—47 |
| 3,034,700 | 5/1962 | Hickman | 260—613 |
| 3,134,753 | 5/1964 | Kwiatek | 260—47 |

OTHER REFERENCES

Hay: J.A.C.S., pp. 6335-6 (December 1959).
Staflin: Rubber World, pp. 408, vol. 139, December 1958.

WILLIAM H. SHORT, *Primary Examiner.*

H. N. BURSTEIN, *Examiner.*